Figure 1:
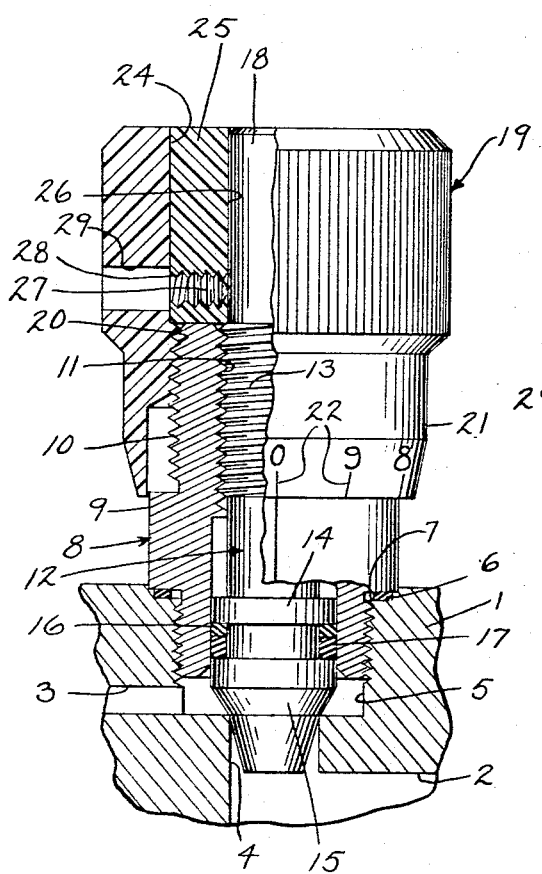

Aug. 8, 1967 V. P. DONNER 3,334,654
OPERATING AND READ-OUT MEANS FOR NEEDLE
VALVES AND THE LIKE
Filed Sept. 27, 1965 2 Sheets-Sheet 1

INVENTOR
VERNE P. DONNER

BY *Allan W. Leiser*

ATTORNEY

Aug. 8, 1967   V. P. DONNER   3,334,654
OPERATING AND READ-OUT MEANS FOR NEEDLE
VALVES AND THE LIKE
Filed Sept. 27, 1965   2 Sheets-Sheet 2
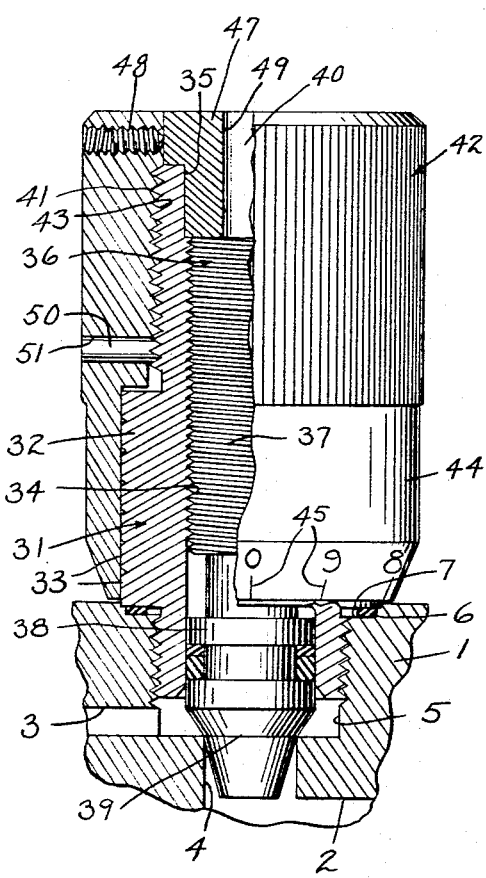
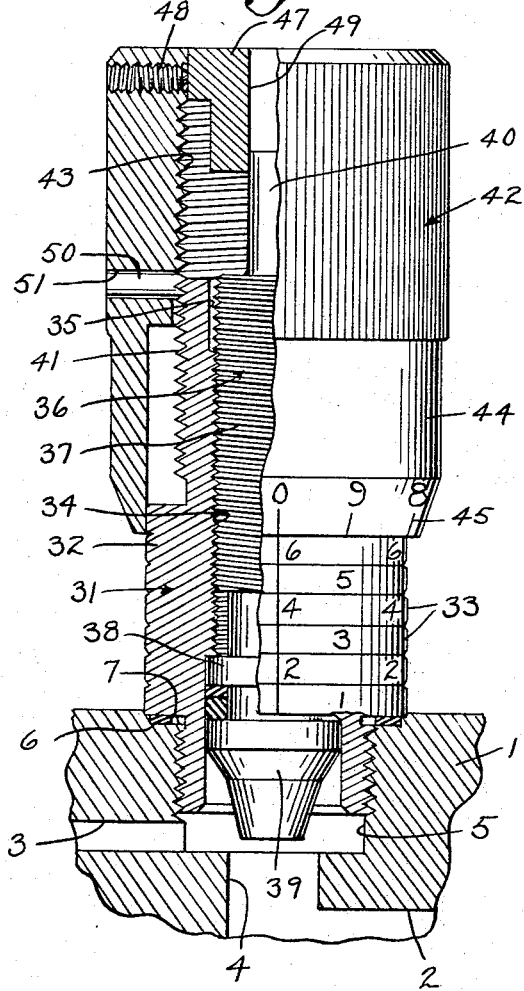
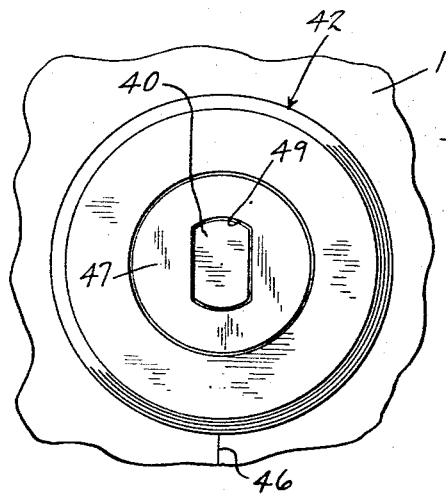
INVENTOR
VERNE P. DONNER
BY Allan W. Leiser
ATTORNEY

… … … …

United States Patent Office 3,334,654
Patented Aug. 8, 1967

3,334,654
OPERATING AND READ-OUT MEANS FOR NEEDLE VALVES AND THE LIKE
Verne P. Donner, Palatine, Ill., assignor to Deltrol Corp., Bellwood, Ill., a corporation of Delaware
Filed Sept. 27, 1965, Ser. No. 490,270
8 Claims. (Cl. 137—553)

This invention relates to operating and read-out means for needle valves and other devices including a threaded, axially movable stem. The invention resides more particularly in means including a threaded, axially movable operating knob for the stem, the knob and stem having different thread connections so that axial movement of the stem is in effect magnified as read by the position of the knob on a calibrated read-out column.

Conventional needle valves often include a bonnet surrounding the valve stem, which bonnet extends outwardly of the valve body and has a calibrated cylindrical portion immediately adjacent the body. An operating knob is fixed to the outer end of the stem and has a skirt which surrounds the bonnet. As the knob is turned to open the valve, the skirt edge moves outwardly along the calibrated bonnet portion and serves to indicate the axial position of the stem. Usually, the bonnet calibration system comprises a series of circumferential bands, each equal in width to the pitch of the stem threads. Thus, for each turn of the knob and stem a successive band is uncovered, and by determining how many bands have been uncovered the operator is able to tell how many turns the valve has been opened. Fractions of turns are generally read by means of radially spaced lines on the knob skirt which relate to a base line on the bonnet or on the valve body.

Such previously used constructions are generally satisfactory for stems having a relatively great thread pitch. In such cases there is substantial axial movement of the stem for each turn, and, therefore, the calibrating bands are relatively wide. For very fine threads, however, the calibrating bands are necessarily quite narrow, perhaps only one-half or one millimeter. It is then very difficult to read the position of the stem, especially when the valve is placed in a dark or inaccessible location. The same problem is also encountered in other devices, such as micrometer calipers.

It is the general object of this invention to provide operating and read-out means for a needle valve, or any device including a threaded stem, in which axial movement of the stem is, in effect, magnified to afford a clearly visible indication of the position of the stem even if it has extremely fine threads.

It is another object to provide one embodiment of the invention in which visibility is further enhanced by having the calibrated end of a read-out column at the outer end of an operating knob rather than being under the knob as is conventional.

It is a further object of the invention to provide operating and read-out means which provide any desired magnification within a broad range.

It is still another object of the invention to provide operating and read-out means in which magnification is provided without any loss whatsoever in accuracy.

Other objects of the invention include providing two embodiments of novel operating and read-out means, each of which is sturdy and effective, accurate, long wearing, and relatively simple and inexpensive to manufacture, assemble, use and repair.

Other objects and advantages will appear from the description to follow. In the description, reference is made to the accompanying drawings, forming a part hereof, in which there are shown, by way of illustration and not of limitation, two preferred embodiments of the invention.

Figure 2:
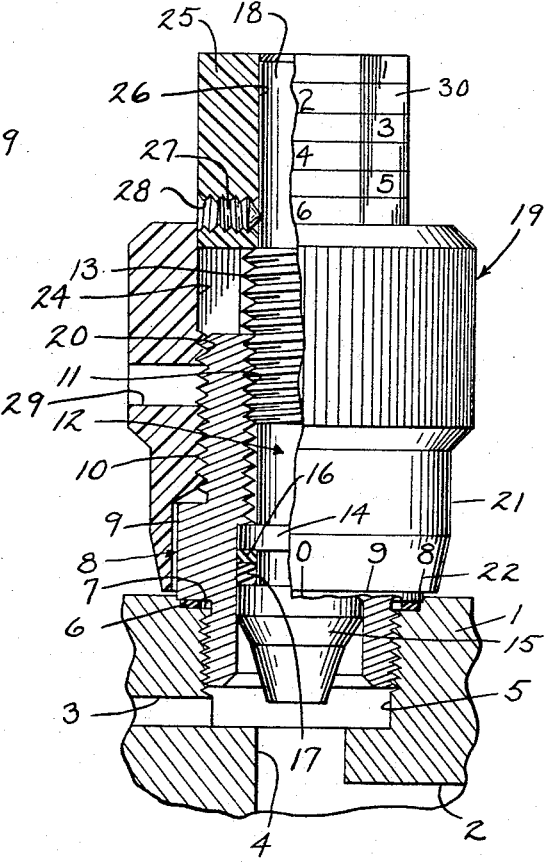
Figure 3:
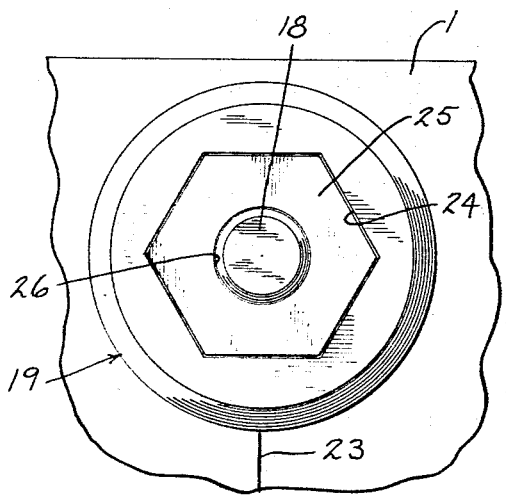

In the drawings:

FIG. 1 is a fragmentary view in elevation, with parts shown broken away and in cross section, showing a needle valve incorporating one embodiment of operating and read-out means formed according to this invention, the valve being shown in closed position, FIG. 2 is a view similar to FIG. 1, but with the valve shown in a fully open position, FIG. 3 is a fragmentary top plan view further illustrating the embodiment of FIG. 1, FIG. 4 is a fragmentary view in elevation, with parts shown broken away and in cross section, showing another embodiment of the invention, also incorporated in a needle valve, the valve being shown in closed position, FIG. 5 is a view similar to FIG. 4, but showing the valve in a fully open position, and FIG. 6 is a fragmentary top plan view further illustrating the embodiment of FIG. 4.

Both embodiments of the invention are shown incorporated in the same, conventional, needle valve body 1, which includes an inlet bore 2, an outlet 3 and a connecting bore 4 which is opened and closed by means of a valve stem as will be described. A threaded bonnet opening 5 is axially aligned with the bore 4 and leads outwardly through the valve body 1. A compressible sealing washer 6 is disposed in an annular recess 7 about the bonnet opening 5 and is compressed in place by a bonnet as will be described to afford a fluid-tight seal. The valve body is identical for both embodiments and, therefore, the same reference numerals are used in all drawing views for the body and its aforementioned elements. Since the general configuration of needle valves is well understood in the art, and since the operating and read-out means of this invention may find use in valves of widely differing types or in other devices, the valve in which the embodiments of the invention are incorporated has not been shown nor will it be described in further detail herein.

The embodiment of the invention shown in FIGS. 1–3 includes a generally tubular bonnet 8 which has an externally threaded inner end that is received within the threaded body opening 5. Immediately outwardly of the body 1 is an enlarged cylindrical bonnet portion 9, the inner end of which is very slightly recessed into the valve body 1 and serves to compress the washer 6 against the floor of the deeper washer recess 7. The washer 6 is preferably made to be thicker than the depth of the recess 7 to insure that it will be compressed to form a tight seal upon the insertion of the bonnet 8. Since the inner end of the bonnet portion 9 rests against the valve body 1, the bonnet 8 will have the same orientation with respect to the body 1 regarless of the force used to tighten it in place, this arrangement being preferable to the tapered pipe thread connection sometimes used in which extra tightening can cause a bonnet to be moved further inwardly with respect to a valve body.

A reduced outer end portion of the bonnet 8 is provided with external threads 10 and upset internal threads 11. The threads 10 and 11 have approximately the same pitch, but the external threads 10 are left-hand while the internal threads 11 are right-hand to provide magnification as will be described.

A stem 12 of more or less conventional design has an intermediate right-hand threaded portion 13 engaged with the internal bonnet threads 11, the stem 12 thus being surrounded by and threadedly connected to the bonnet 8 for axial movement into and out of the body 1. Below the threads 13 is an annular land 14 and below this is a tapered valve head 15 adapted to close off the bore 4. A sealing washer 16 and an O-ring 17 are held captive between the land 14 and head 15 and provide a fluid tight seal between the stem 12 and bonnet 8. The land 14 is adapted to strike the upset threads 11 to limit movement of the stem 12 outwardly with respect to the bonnet 8. Above the threaded portion 13 is a smooth, circular cylindrical outer end portion 18.

A generally tubular, manually engageable knob 19 surrounds the bonnet 8 and is provided with an intermediate internal left-hand threaded portion 20 engaged with the bonnet threads 10, the knob 19 thus being mounted for axial movement coaxially with the stem 12. The knob 19 is preferably formed of a plastic material such as nylon which will insure a good gripping characteristic with the threads 10 to prevent undesirable movement or loosening of the knob 19.

The knob 19 has a downwardly depending skirt 21 which surrounds and receives the bonnet cylinder portion 9, and the knob 19 is engageable with the upper edge of the cylinder portion 9 to limit movement of the knob 19 inwardly with respect to the valve body 1. The outer surface of the lower edge of the skirt 21 is provided with radially spaced markings 22 which, with a base line 23 extending down the cylinder portion 9 and onto the valve body 1, seen in FIGS. 2 and 3, serve to indicate the radial position of the knob 19 and, as will be described, the stem 12.

Above the internal threaded portion 20, the knob 19 is provided with an outwardly opening polygonal bore 24, hexagonal in the preferred form shown, within which is disposed a polygonal, hexagonal key block 25, also preferably formed of a plastic material such as nylon. The block 25 is relatively freely axially slidable in the bore 24, but the polygonal configuration of both establishes a key connection so that the knob 19 and block 25 rotate together.

The block 25 is provided with a central circular cylindrical bore 26 which receives the outer end 18 of the stem 12 with a relatively tight fit. A threaded set screw 27 received in a threaded bore 28 provided in the block 25 serves to fix the block 25 to the stem 12 for simultaneous rotational and axial movement. The knob 19 has a relatively larger radial bore 29 which, when the knob 19 and block 25 are in the positions of FIG. 1, affords access for insertion and removal of the set screw 27.

As can be seen most clearly in FIG. 2, the outer surface of the key block 25 is marked off to define a series of circumferential bands 30 which are numbered consecutively, beginning with the outermost.

When the valve of the embodiment of FIGS. 1–3 is in closed position, with the head 15 closing off the bore 4, the various elements of the operating and read-out means are in the positions shown in FIG. 1. The knob 19 is then in an outer position spaced from the valve body 1. In this position, the key block 25 is received entirely within the hexagonal bore 24 and rests atop the bonnet 8 so that none of the bands 30 is exposed. In fully closed position, the "0" radial marking 22 of the skirt 21 will be in alignment with the base line 23.

When the valve is to be opened, the knob 19 is rotated in counterclockwise fashion. Since the threads 10, 20 connecting the knob 19 and bonnet 8 are left-hand threads, this rotation will cause the knob 19 to be moved inwardly with respect to the valve body 1. Rotation of the knob 19 will be transmitted to the stem 12 through the block 25 which serves, in effect, as a key connecting the knob 19 and stem 12 together for simultaneous rotation. The threads 11, 13 connecting the stem 12 with the bonnet 8 are, however, right-hand threads, and such rotation will cause the stem 12 to be moved outwardly toward an open position. The key connection afforded by the slidable block 25 allows for resulting relative axial movement between the stem 12 and knob 19. During opening, the block 25 moves outwardly away from the bonnet 8.

For each complete turn, the knob 19 will move inwardly the length of one thread pitch of the threads 10, 20 while the stem 12 and block 25 will move outwardly the length of one thread pitch of the threads 11, 13, gradually exposing the outer end of the block 25 until the valve reaches a fully opened position, shown in FIG. 2. In this embodiment of the invention, the thread pitches of the thread pairs 10, 20 and 11, 13 are equal, so that the block 25 will be exposed at a rate exactly twice the rate of outward movement of the stem 12. Each band 30 has a width equal to two thread pitches, so that one band 30 will be exposed for each complete turn. By determining the number of bands 30 that are exposed, therefore, the operator will be able to determine how many complete turns the valve has been opened. In the position of FIG. 2, the valve has been opened six turns and is fully open. During opening, the radial markings 22 and base line 23 enable the operator to read fractional turns in the usual fashion.

Since the bands 30 are of widths equal to twice the thread pitch of the stem connecting threads 11, 13, they are readily visible to the operator, even where the connecting threads are quite fine. Further, in this embodiment the bands 30 are exposed at the top of the knob 19 where they are clearly visible even when the valve is in a relatively inaccessible location.

The embodiment of FIGS. 4–6 is similar to the embodiment of FIGS. 1–3, but operates in somewhat different fashion. It includes a generally tubular bonnet 31, having an inner threaded portion received in the bonnet opening 5. Immediately outwardly of the valve body 1 is a cylindrical bonnet portion 32 that is similar to the cylinder portion 9 but is of greater axial length. As can be seen in FIG. 5, the outer surface of the cylinder portion 32 is calibrated to define a series of circumferential bands 23 which are numbered consecutively beginning with the one closest to the valve body 1.

A reduced outer end of the bonnet 31 is provided with upset internal right-hand threads 34 of relatively fine pitch. Outwardly of the threads 34 the bonnet 31 has a somewhat enlarged, outwardly opening circular cylindrical socket 35.

A stem 36 has an intermediate threaded portion 37 by means of which it is threaded in the bonnet 31 for axial movement toward and away from the body 1. Below the threaded portion 37 are a land 38, which is adapted to strike the threads 34 to limit outward movement of the stem 36, and a head 39, adapted to seal off the bore 4. Above the threads 37 is a reduced outer end portion 40 having a generally rectangular cross section.

The bonnet 31 is also provided with external right-hand threads 41, which have a pitch twice that of the threads 34. A tubular operating knob 42, formed of metal in this embodiment, but which may also be of plastic, surrounds the bonnet 31 and is provided with internal right-hand threads 43 by means of which it is threaded on the bonnet 31 for axial movement coaxial with the movement of the stem 36. The knob 42 has a downwardly depending skirt 44 which surrounds the bonnet cylinder portion 32. The skirt 44 is provided with radially spaced markings 45 which relate to a base line 46 on the cylinder portion 32 and valve body 1.

A stepped, circular cylindrical metal key block 47 is received in the upper portion of the knob 42 with its lower portion of reduced diameter being received in the bonnet socket 35 when the valve is in position of FIG. 4. A set screw 48 fixes block 47 to the knob 42 for simultaneous rotational and axial movement.

The block 47 is provided with a central bore 49 of rectangular cross section which receives the stem end 40 to establish a key connection providing for simultaneous rotation of the block 47 and stem 36 while allowing for relative axial movement therebetween.

When the valve of the embodiment of FIGS. 4–6 is in closed position, with the stem 36 closing off the bore 4, the various elements occupy the positions of FIG. 4. The knob 42 is in an inner position next to the valve body 1, wherein the entire cylindrical bonnet portion 32 is covered by the skirt 44. In closed position, the lower reduced portion of the block 47 is received entirely within the bonnet socket 35.

When the valve is to be opened, the knob 42 is turned in counterclockwise fashion, and since the block 47 connects the knob 42 and stem 36 for simultaneous rotation, each turn of the knob 42 results in a turn of the stem 36. The axial movement of the stem 36 is, however, relativley small for each turn, being determined by the relatively fine pitch of the threads 34, 37 connecting it to the bonnet 31. The pitch of the threads 41, 43 connecting the knob 42 to the bonnet 31 is twice as great, however, and the knob 42 will move axially outwardly twice as far as the stem 36 for each turn, the key connection afforded by the block 47 allowing for relative axial movement of the knob 42 and stem 36. During turning, the block 47 moves away from the bonnet 31.

When the valve is fully open, taking six turns in the embodiment shown, the various elements are in the positions of FIG. 5. The bands 33 are of widths equal to the pitch of the threads 41, 43 connecting the knob 42 to the bonnet 31, so that one band 33 is exposed for each turn, six being exposed in FIG. 5. The bands 33 are, however, twice as wide as the pitch of the threads 34, 37 connecting the stem 36, resulting in greater visibility for the operator. As in the embodiment of FIGS. 1–3, the radial markings 45 and base line 46 enable the operator to read fractions of a turn.

The embodiment of FIGS. 4–6 also includes a plastic, preferably nylon plug 50 jammed into a bore 51 in the knob 42 with its inner end tightly against the bonnet threads 41. The plug 50 is wiped along the threads 41 as the knob 42 moves and deposits a thin coating of plastic thereon which provides a good gripping characteristic preventing undesired movement of the knob 42. If desired, the plug 50 and bore 51 can be threaded so that the plug 50 can be moved further inwardly as it wears, but the initial wiping provided by the construction shown has been found satisfactory in providing continued gripping even after long use.

Although the embodiments of FIGS. 1–3 and FIGS. 4–6 use different thread connections, the basic operation of both embodiments is essentially the same. In each case, there is a threaded axially movable stem and a bonnet concentric therewith. For both embodiments, there is a manually engageable knob threaded to the bonnet for axial movement coaxially with the stem. Also, there is in both embodiments a key block which is fixed to either the knob or stem and has a key connection with the other, which block is thus operatively interposed between and serves, in effect, as a key connection between the knob and stem providing for simultaneous rotation of the two while allowing for relative axial movement therebetween. In both embodiments, the key block and bonnet form what can be termed a read-out column having a calibrated end, although the calibrations are on the outer block 25 in the embodiment of FIGS. 1–3 and on the inner cylinder portion 32 in the embodiment of FIGS. 4–6.

In both embodiments, there are different thread connections for the knob and stem, causing relative axial movement as the knob is turned. At the same time, the key block moves away from the bonnet. In effect, therefore, as the knob is rotated the read-out column formed by the block and bonnet varies in length and the calibrated end thereof is gradually exposed at one end of the knob. In both forms, the rate of exposure of the read-out column is directly proportional to but substantially greater than the rate of movement of the stem in the valve. Both forms have key connections so that the knob and stem turn together, thus insuring magnification without a loss of accuracy.

Although two preferred embodiments of the invention have been shown and described herein, it will be obvious that various modifications may be made within the scope of the invention. With the embodiments of FIGS. 1–3, for example, the pitch of the thread pairs 11, 13 and 10, 20 connecting the stem and knob, respectively, to the bonnet 8 could be different to provide different magnification using the same essential action. Various forms of key connections and concentric arrangement of the elements could also be substituted and some elements, such as the key block 47 and knob 42 in the embodiment of FIGS. 4–6, could be formed integrally rather than as separate elements. If desired, the stem of both embodiments could be threaded directly to the valve body rather than the bonnet. Again, both forms of the invention are particularly suited for needle valves, but either would be useful in other devices. Since these and other modifications in structure and use are possible, it is not intended that the invention be limited by the disclosure herein, or in any other way, except insofar as limitations appear specifically in the following claims.

I claim:

1. Operating and read-out means for a device having a body and a stem projecting outwardly of the body that is threaded for axial movement inwardly and outwardly with respect to the body, said means comprising: a bonnet extending outwardly from the body; a manually engageable knob threadedly connected to the bonnet to be axially movable toward and away from the body; key block means operatively interposed between the knob and the stem to connect the same for simultaneous rotation causing axial movement of both while allowing for relative axial movement therebetween, the block and bonnet together forming a read-out column, the thread connections of the stem and knob being of different pitch so that upon simultaneous rotation of the knob and stem the knob and stem have relative axial movement and the block is moved with respect to the bonnet to vary the length of the read-out column and expose one end of the column at one end of the knob, the rate of exposure of the read-out column being directly proportional to but substantially greater than the rate of axial movement of the stem.

2. Operating and read-out means for a device having a body and stem projecting outwardly of the body that is threaded for axial movement inwardly and outwardly with respect to the body, said means comprising: a bonnet mounted on and extending outwardly from the body that is concentric with the stem; a manually engageable knob threaded on the bonnet to be axially movable toward and away from the body coaxially with the stem; key block means disposed adjacent the outer end of the bonnet that is operatively interposed between the knob and the stem to connect the same for simultaneous rotation causing axial movement of both while allowing for relative axial movement therebetween, the block and bonnet together forming a read-out column one end of which is calibrated and adapted to extend through one end of the knob, the thread connections for the stem and knob being of different pitch so that upon simultaneous rotation of the knob and stem the knob and stem have relative axial movement and the block is moved axially with one of the knob and stem to vary the length of the read-out column and to expose the calibrated end thereof at one end of the knob, the rate of exposure of the read-out column being directly proportional to but substantially greater than the rate of axial movement of the stem.

3. Operating and read-out means for a device having a body and stem projecting outwardly of the body that is threaded for axial movement inwardly and outwardly with respect to the body, said means comprising: a bonnet mounted on and extending outwardly from the body that is concentric with the stem; a manually engageable knob surrounding and threaded on the bonnet to be axially movable toward and away from the body coaxially with the stem; key block means disposed adjacent the outer end of the bonnet that is fixed to one of the knob and stem and has a slidable key connection with the other, the block serving as a key connection between the knob and stem connecting the same for simultaneous rotation causing axial movement of both while allowing for relative axial movement therebetween, the block and bonnet together forming a read-out column one end of which is calibrated, the thread connections for the stem and knob being of different pitch so that upon simultaneous rotation of the knob and stem there is relative axial movement between the knob and stem and the block is moved with said one of the knob and stem axially with respect to the bonnet to vary the length of the read-out column and to expose the calibrated end thereof at one end of the knob, the rate at which the calibrated end of the read-out column is exposed being directly proportional to but substantially greater than the rate of axial movement of the stem.

4. Operating and read-out means for a needle valve and the like comprising a body; a generally tubular bonnet mounted on and extending outwardly of the body and having internal and external sets of threads, one of said sets of threads being right-handed and the other being left-handed; a stem surrounded by the bonnet and threadedly connected to the internal threads thereof for axial movement inwardly and outwardly with respect to the body, said stem having an outer end removed from the body; a generally tubular knob surrounding the bonnet and threadedly connected to the external threads thereof for axial movement toward and away from the body coaxial with the needle; a key block having a slidable key connection with the knob, said block having a bore therethrough which receives the outer end of the stem, the outer surface of said block being calibrated; and means fixing the block to the stem for simultaneous rotational and axial movement therewith.

5. Operating and read-out means for a needle valve and the like comprising a body; a generally tubular bonnet mounted on and extending outwardly of the body and having internal and external sets of threads, one of said sets of threads being right-handed and the other being left-handed; a stem passing through the bonnet and threadedly connected to the internal threads thereof for axial movement inwardly and outwardly with respect to the body, said stem having an outer end removed from the body; a generally tubular knob surrounding the bonnet and threadedly connected to the external threads thereof for axial movement toward and away from the body coaxially with the needle, said knob being provided at its outer end with an outwardly opening polygonal bore; a key block having a polygonal configuration mating with that of the knob bore and axially slidably disposed therein, said block having a bore therethrough which receives the outer end of the stem, the outer surface of said block being calibrated; and means fixedly connecting the block to the stem for simultaneous rotational and axial movement therewith.

6. Operating and read-out means according to claim 5 wherein the means connecting the block and stem comprises a threaded set screw disposed in a radial threaded bore in the block and the knob is provided with a radial access bore affording access to the set screw when the block is in a selected axial position in the polygonal knob bore.

7. Operating and read-out means for a needle valve and the like comprising: a body; a generally tubular bonnet mounted on and extending outwardly from the body, said bonnet including a calibrated cylindrical portion immediately adjacent the body, external threads above said cylindrical portion, and internal threads having a pitch substantially less than the pitch of the external threads; a stem passing through and threadedly connected to the internal threads of the bonnet to be axially movable inwardly and outwardly with respect to the valve body, said stem having an outer end; a knob threadedly connected to the external threads of the bonnet and having a skirt surrounding the cylindrical calibrated portion thereof; a key block disposed outwardly of the bonnet that is fixedly connected to the knob for simultaneous rotational and axial movement therewith, said key block having a slidable key connection with the outer end of the stem to provide for simultaneous rotation of the knob and stem while allowing for relative axial movement therebetween.

8. Operating and read-out means for a needle valve and the like comprising: a body; a generally tubular bonnet mounted on and extending outwardly from the body, said bonnet including a calibrated cylindrical portion immediately adjacent the body, external threads above said cylindrical portion, and internal threads having a pitch substantially less than the pitch of the external threads; a stem extending through and threadedly connected to the internal threads of the bonnet to be axially movable inwardly and outwardly with respect to the valve body, said stem having an outer end of polygonal cross section; a knob threadedly connected to the external threads of the bonnet and having a skirt surrounding the cylindrical calibrated portion thereof; a key block disposed within the knob and outwardly of the bonnet that is fixedly connected to the knob for simultaneous rotational and axial movement therewith, said key block having a bore therethrough of polygonal cross section mating with and receiving the outer end of the stem to provide for simultaneous rotation of the knob and stem while allowing for relative axial movement therebetween.

No references cited.

M. CARY NELSON, *Primary Examiner.*

H. KLINKSIEK, *Assistant Examiner.*